US010088353B2

(12) United States Patent
Kuvshinov et al.

(10) Patent No.: US 10,088,353 B2
(45) Date of Patent: Oct. 2, 2018

(54) CABLE COMPRISING TWISTED SINUSOID FOR USE IN DISTRIBUTED SENSING

(71) Applicant: SHELL OIL COMPANY, Houston, TX (US)

(72) Inventors: Boris Nikolaevich Kuvshinov, Nieuwegein (NL); Johan Cornelis Hornman, The Hague (NL)

(73) Assignee: SHELL OIL COMPANY, Houston, TX (US)

( * ) Notice: Subject to any disclaimer, the term of this patent is extended or adjusted under 35 U.S.C. 154(b) by 659 days.

(21) Appl. No.: 14/418,393

(22) PCT Filed: Jul. 30, 2013

(86) PCT No.: PCT/US2013/052647
§ 371 (c)(1),
(2) Date: Jan. 29, 2015

(87) PCT Pub. No.: WO2014/022346
PCT Pub. Date: Feb. 6, 2014

(65) Prior Publication Data
US 2015/0260567 A1 Sep. 17, 2015

Related U.S. Application Data

(60) Provisional application No. 61/678,482, filed on Aug. 1, 2012.

(51) Int. Cl.
G01H 9/00 (2006.01)
G02B 6/44 (2006.01)

(52) U.S. Cl.
CPC ........... G01H 9/004 (2013.01); G02B 6/4413 (2013.01)

(58) Field of Classification Search
CPC ................ G01H 9/004; G02B 6/4413
See application file for complete search history.

(56) References Cited

U.S. PATENT DOCUMENTS 4,568,408 A 2/1986 Schmadel et al.
4,634,852 A 1/1987 Shaw
(Continued)

FOREIGN PATENT DOCUMENTS

EP 1299698 10/2010
GB 2364380 1/2002
(Continued)

OTHER PUBLICATIONS

"Fiber optic sensor technology", www.AutomotiveTestingTechnologyInternational.com, Jun. 2015.*
(Continued)

Primary Examiner — Mischita Henson

(57) ABSTRACT

A distributed fiber optic cable comprises an elongate body and a first optical fiber longitudinally housed in the body, wherein the fiber describes a sinusoid having an amplitude and a first wavelength along the length of the body and wherein the sinusoid rotates along the length of the body so as to describe a twisted sinusoid having a twist wavelength. A method for sensing an acoustic wave comprises a) providing a set of signals collected from the cable, b) processing the signals so as to divide the fiber in each twist wavelength of cable into a predetermined number of channels, c) measuring the amplitudes in each channel and calculating the maximum and minimum amplitude in a preselected length of cable, d) using the calculated maximum and minimum for the preselected length of cable to determine the amplitude and direction of the wave at the preselected length of cable.

11 Claims, 2 Drawing Sheets

(56) References Cited

U.S. PATENT DOCUMENTS

| | | |
|---|---|---|
| 6,268,911 B1 | 7/2001 | Tubel et al. |
| 6,269,198 B1 * | 7/2001 | Hodgson ............... G01H 9/004 |
| | | 356/478 |
| 6,281,489 B1 | 8/2001 | Tubel et al. |
| 6,588,266 B2 | 7/2003 | Tubel et al. |
| 6,787,758 B2 | 9/2004 | Tubel et al. |
| 6,853,780 B1 | 2/2005 | Brandi et al. |
| 7,040,390 B2 | 5/2006 | Tubel et al. |
| 7,201,221 B2 | 4/2007 | Tubel et al. |
| 7,284,903 B2 | 10/2007 | Hartog |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2004/0043501 A1 | 3/2004 | Means et al. |
| 2005/0115741 A1 | 6/2005 | Terry et al. |
| 2006/0233482 A1 | 10/2006 | Rambow |
| 2009/0188665 A1 | 7/2009 | Tubel et al. |
| 2009/0219171 A1 | 9/2009 | Vigneaux |
| 2010/0107754 A1 | 5/2010 | Hartog et al. |
| 2010/0207019 A1 | 8/2010 | Hartog et al. |
| 2010/0254650 A1 | 10/2010 | Rambow |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick |
| 2011/0292763 A1 | 12/2011 | Coates et al. |
| 2012/0017687 A1 | 1/2012 | Davis et al. |
| 2012/0018149 A1 | 1/2012 | Fidan et al. |
| 2012/0057432 A1 | 3/2012 | Hill et al. |

FOREIGN PATENT DOCUMENTS

| | | |
|---|---|---|
| WO | 2009158630 | 12/2009 |
| WO | 2010010318 | 1/2010 |
| WO | 2010034986 | 4/2010 |
| WO | 2010136764 | 12/2010 |
| WO | 2010136810 | 12/2010 |
| WO | 2011110110 | 1/2011 |
| WO | 2011039501 | 4/2011 |
| WO | 2011058312 | 5/2011 |
| WO | 2011058313 | 5/2011 |
| WO | 2011058314 | 5/2011 |
| WO | 2011058322 | 5/2011 |
| WO | 2011067554 | 6/2011 |
| WO | 2011076850 | 6/2011 |
| WO | 2011079107 | 6/2011 |
| WO | 2011141537 | 11/2011 |
| WO | 2011148128 | 12/2011 |

OTHER PUBLICATIONS

Barrias, Antonio et al., "A Review of Distributed Optical Fiber Sensors for Civil Engineering Applications", May 23, 2016, Sensors.*

PCT International Search Report, Application No. PCT/US2012/069464 dated Mar. 28, 2013.

PCT International Search Report, Application No. PCT/US2013/052647 dated Jan. 2, 2014.

* cited by examiner

CABLE COMPRISING TWISTED SINUSOID FOR USE IN DISTRIBUTED SENSING

CROSS-REFERENCE TO RELATED APPLICATIONS

The present application is a National Stage (§ 371) application of PCT/US2013/052647, filed Jul. 30, 2013, which claims the benefit of U.S. Provisional Application No. 61/678,482, filed Aug. 1, 2012. This case is also related to U.S. Application Ser. No. 61/576,192, filed Dec. 15, 2011, and entitled "Detecting Broadside Acoustic Signals With A Fiber Optical Distributed Acoustic Sensing (Das) Assembly," which is incorporated herein by reference in its entirety.

FIELD OF THE INVENTION

The invention relates to fiber optic devices and in particular to a fiber optical Distributed Acoustic Sensing (DAS) assembly that is adapted to sense the magnitude and direction of acoustic signals, and particularly those signals that are travelling at an angle or substantially perpendicular to the device.

BACKGROUND OF THE INVENTION

Various attempts have been made to provide sensing capabilities in the context of petroleum exploration, production, and monitoring, with varying degrees of success. Recently, these attempts have included the use of fiber optic cables to detect acoustic energy. Because the cables typically comprise optically conducting fiber containing a plurality of backscattering inhomogeneities along the length of the fiber, such systems allow the distributed measurement of optical path length changes along an optical fiber by measuring backscattered light from a laser pulse input into the fiber. Because they allow distributed sensing, such systems may be referred to as "distributed acoustic sensing" or "DAS" systems. One use of DAS systems is in seismic applications, in which seismic sources at known locations transmit acoustic signals into the formation, and/or passive seismic sources emit acoustic energy. The signals are received at seismic sensors after passing through and/or reflecting through the formation. The received signals can be processed to give information about the formation through which they passed. This technology can be used to record a variety of seismic information. Another application is in the field of in-well applications and acoustic fluid monitoring.

DAS systems typically detect backscattering of short (1-10 meter) laser pulses from impurities or inhomogeneities in the optical fiber. If fiber is deformed by an incident seismic wave then 1) the distance between impurities changes and 2) the speed of the laser pulses changes. Both of these effects influence the backscattering process. By observing changes in the backscattered signal it is possible to reconstruct the seismic wave amplitude. The first of the above effects appears only if the fiber is stretched or compressed axially. The second effect is present in case of axial as well as radial fiber deformations. The second effect is, however, several times weaker than the first. Moreover, radial deformations of the fiber are significantly damped by materials surrounding the fiber. As a result, a conventional DAS system with a straight fiber is mainly sensitive to seismic waves polarized along the cable axis, such as compression (P) waves propagating along the cable or shear (S) waves propagating perpendicular to the cable. The strength of the signal varies approximately as $\cos^2 \theta$, where $\theta$ is the angle between the fiber axis and the direction of wave propagation (for P waves). Thus, while there exists a variety of commercially available DAS systems that have varying sensitivity, dynamic range, spatial resolution, linearity, etc., all of these systems are primarily sensitive to axial strain. Acoustic signals travelling normal to the fiber axis may sometimes be referred to as "broadside" signals and, for P waves, result in radial strain on the fiber. Thus, as the angle between direction of travel of the acoustic signal and the fiber axis approaches 90°, DAS cables become much less sensitive to the signal and may even fail to detect it. The Appendix attached hereto provides further discussion of the mathematics of sinusoidal fibers.

Hence, it is desirable to provide an improved cable that is more sensitive to signals travelling normal to its axis and enables distinguishing radial strain from the axial strain. Sensitivity to broadside waves is particularly important for seismic or microseismic applications, with cables on the surface or downhole. In addition to broadside sensitivity, it is also desirable to provide three-component (3C) sensing, from which the direction of travel of the sensed signal can be determined.

SUMMARY OF THE INVENTION

In accordance with preferred embodiments of the invention there is provided a distributed fiber optic cable comprising an elongate body and a first optical fiber longitudinally housed in the body, wherein the fiber describes a sinusoid having an amplitude and a first wavelength along the length of the body and wherein the sinusoid rotates along the length of the body so as to describe a twisted sinusoid having a twist wavelength.

The cable may provides a plurality of sensing channels and the first wavelength may be a function of a desired channel length. The first wavelength may also be a function of the amplitude.

The first wavelength may be between 0.001 and 0.1 m, between 0.005 and 0.1 m, or more preferably between 0.005 and 0.05 m. The twist wavelength may be between 1 m and 50 m, between 2 m and 20 m, or more preferably approximately 10 m.

The fiber optic cable may define a helix.

The amplitude may be a function of the thickness of the body.

The invention further provides a method for sensing an acoustic wave, comprising a) providing a set of signals collected from a distributed fiber optic cable comprising an elongate body and a first optical fiber longitudinally housed in said body, wherein the fiber describes a sinusoid having an amplitude and a first wavelength along the length of the body and wherein the sinusoid rotates along the length of the body so as to describe a twisted sinusoid having a twist wavelength, b) processing the signals so as to divide the fiber in each twist wavelength of cable into a predetermined number of channels, c) measuring the amplitudes in each channel and calculating the maximum and minimum amplitude in a preselected length of cable, and d) using the calculated maximum and minimum for the preselected length of cable to determine the amplitude and direction of the wave at the preselected length of cable.

The preselected length of cable in step c) may be equal to one-half of the twist wavelength. The twist wavelength may be between 1 m and 50 m and the predetermined number of channels may be 10. The twist wavelength is between 2 m and 20 m. More preferably, the twist wavelength is 10 m and the preselected length of cable in step c) is 5 m.

BRIEF DESCRIPTION OF THE DRAWINGS

For a more detailed understanding of the invention, reference is made to the accompanying Figures wherein.

DETAILED DESCRIPTION OF A PREFERRED EMBODIMENT

An initial analysis starts with a configuration in which three sinusoidal fibers lie in the three longitudinal surfaces of a triangular prism as shown below. All three fibers are assumed to have the same shape.

Figure 1:
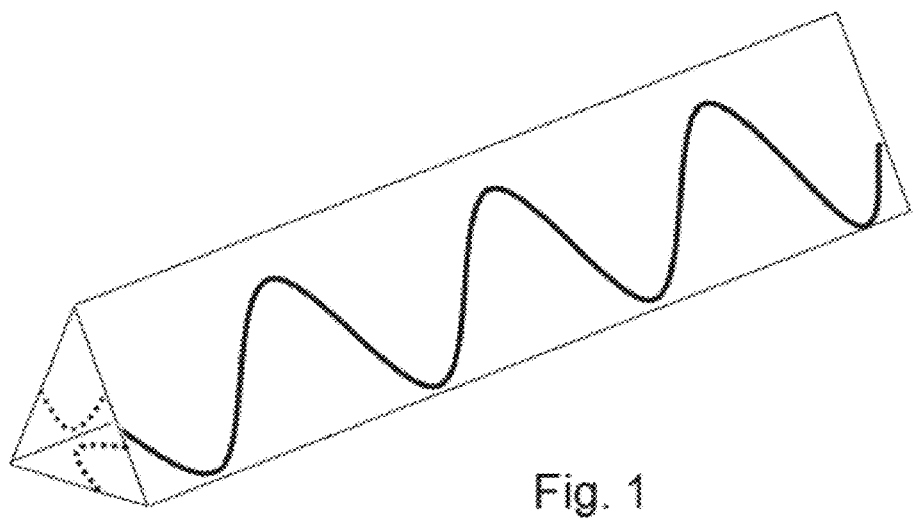
FIG. 1 is a schematic view of a triangular prism having a sinusoidal path along each of its longitudinal surfaces.
Figure 2:
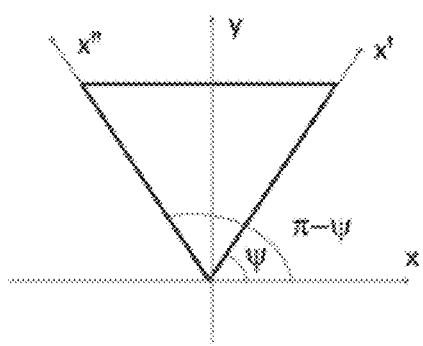
FIG. 2 is a schematic view of a coordinate system.

A coordinate system (x, y, z) is chosen such that the z axis is directed along the prism, and x- and y-axes lie in its cross-section. One of the prism sides lies in the (x, z) plane, as illustrated in FIG. 2. Two other sides lie in the (x', z) and (x'', z) planes. The x' and x'' axes are rotated with respect the x-axis on angles $\psi=60$ and $\psi-\pi=120°$ correspondingly.

Generally speaking, the strain tensor $e_{jk}$ has 6 independent components. Using three fibers one can do only 3 independent measurements. These 3 measurements are not sufficient to deduce 6 unknown components of the strain tensor.

Figure 3:
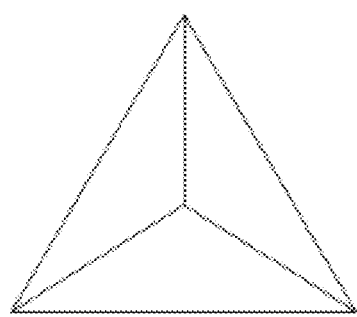
FIG. 3 is an illustration of a possible combination of coordinate systems.

One way to obtain sufficient data may be to combine triangular bodies to form a larger body, as shown in FIG. 3. If the angles are selected to provide sufficient information, all 6 unknown components of the strain tensor may be calculated.

However, the strain tensor can be determined uniquely if with particular types of elastic deformations are assumed. In most geophysical application one measures primary seismic waves. The waves coming from distant targets can be approximately considered as plane waves.

Transformation of the Strain Sensor

Figure 4:
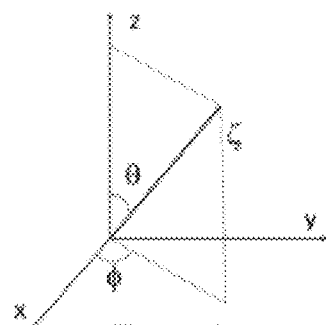
FIG. 4 is a diagram showing orientation of the $\zeta$-axis with respect to the prism coordinate system.

Suppose that a plane primary wave propagates along the $\zeta$-axis. Orientation of the $\zeta$-axis with respect to the prism coordinate system can be specified by two angles, $\theta$ and $\phi$, as is shown in FIG. 4. The strain tensor has only one component $e_{\zeta\zeta}$ in the coordinate system $(\xi,\eta,\zeta)$, where $\xi$ and $\eta$ are arbitrary axes so that the three axes and $\xi$, $\eta$ and $\zeta$ form and orthogonal basis. Components of the strain tensor in two different coordinate systems are related as $$e_{x'x''} = \frac{\partial x'}{\partial \xi}\frac{\partial x''}{\partial \xi}e_{\xi\xi} + \frac{\partial x'}{\partial \eta}\frac{\partial x''}{\partial \eta}e_{\eta\eta} + \frac{\partial x'}{\partial \zeta}\frac{\partial x''}{\partial \zeta}e_{\zeta\zeta} + \left(\frac{\partial x'}{\partial \xi}\frac{\partial x''}{\partial \eta} + \frac{\partial x'}{\partial \eta}\frac{\partial x''}{\partial \xi}\right)e_{\xi\eta} + \left(\frac{\partial x'}{\partial \xi}\frac{\partial x''}{\partial \zeta} + \frac{\partial x'}{\partial \zeta}\frac{\partial x''}{\partial \xi}\right)e_{\xi\zeta} + \left(\frac{\partial x'}{\partial \eta}\frac{\partial x''}{\partial \zeta} + \frac{\partial x'}{\partial \zeta}\frac{\partial x''}{\partial \eta}\right)e_{\eta\zeta}.$$

From which it follows that $$e_{xx}=e_{\zeta\zeta}\sin^2\theta\cos^2\phi,\ e_{yy}=e_{\zeta\zeta}\sin^2\theta\sin^2\phi.$$

$$e_{xy}=e_{\zeta\zeta}\sin^2\theta\sin\phi\cos\phi,\ e_{zz}=e_{\zeta\zeta}\cos^2\theta. \quad (2)$$

In what follows that $e_{\zeta\zeta}$ is positive and it refers to the maximum strain in the wave. Equation (2) shows that the strain tensor in plane primary waves is fully determined by three variables: $e_{\zeta\zeta}$, $\theta$, and $\phi$, that can be reconstructed from three independent measurements. Transition between the coordinate systems (x', y', z) and (x, y, z) is given by the equations $$x'=x\cos\psi+y\sin\psi,\ y'=-x\sin\psi+y\cos\psi. \quad (3)$$

Using Eq. (3) and Eq. (1), gives $$e_{x'x'}=\cos^2\psi e_{xx}+2\sin\psi\cos\psi e_{xy}+\sin^2\psi e_{yy}. \quad (4)$$

The expression for $e_{x''x''}$ is obtained by making the replacement $\psi \to \pi-\psi$ is Eq. (4), $$e_{x''x''}=\cos^2\psi e_{xx}-2\sin\psi\cos\psi e_{xy}+\sin^2\psi e_{yy}. \quad (5)$$

Twisted Sinusoid

Another approach is to use a single twisted strip, so that its orientation angle $\psi$ varies with z. The signal measured by this strip is equal to $$S(\psi)=\alpha(\cos^2\psi e_{xx}+2\sin\psi\cos\psi e_{xy}+\sin^2\psi e_{zz}. \quad (18)$$

Taking the derivative of S with respect to angle $\psi$, gives $$\frac{dS}{dz} = \alpha[-\sin2\psi(e_{xx}-e_{yy})+2\cos2\psi e_{xy}]. \quad (19)$$

Using Eq. (2) to calculate components of the strain tensor, reduces Eq. (19) to $$\frac{dS}{dz} = -\alpha e_{\zeta\zeta}\sin^2\theta\sin[2(\phi-\psi)]. \quad (20)$$

The signal has extrema at the points where dS/dz=0, i.e. at $$\psi=\phi\ \text{and}\ \psi=\phi\pm(\pi/2)$$

It is straightforward to check that the signal has a maximum at $\psi=\phi$ and a minimum at $\psi=\phi\pm(\pi/2)$. The correspondent values of the signal equal to $$S_{max}=e_{\zeta\zeta}(\alpha\sin^2\theta+\cos^2\theta),\ S_{min}=e_{\zeta\zeta}\cos^2\theta. \quad (23)$$

From Eq. 23 it follows that $$\tan^2\theta = \frac{S_{max}-S_{min}}{\alpha S_{min}}. \quad (24)$$

Solving Eq. 24 and substituting the result 23 allows one to reconstruct $e_{\zeta\zeta}$.

EXAMPLE

A hypothetical cable has a radius for outer fibers with a 30-degree wrapping angle of 17.4 mm. A flat strip with a sinusoidal fiber described in the plane of the strip by:

$$y(x)=a\cdot\sin(bx)=a\cdot\sin(\phi)$$

with x=the inline distance along the strip. For a strip length of x=2 $\pi/b$, the length of the fiber equals $$4\frac{\sqrt{1+(ab)^2}}{b}\int_0^{\frac{\pi}{2}}\sqrt{d\varphi\left(1-\frac{(ab)^2}{1+(ab)^2}\cdot\sin^2(\varphi)\right)} =$$

-continued $$4\frac{\sqrt{1+(ab)^2}}{b} \cdot E\left(\sqrt{\frac{(ab)^2}{1+(ab)^2}}\right)$$

E is a complete elliptic integral of the second kind, which can be expressed as a power series.

Continuing the hypothetical, a channel is required every 2 m along the cable, while the channel length measured along the fiber is 8 m. Using a=0.0174 m, it can be calculated that 343.5 sinusoids need to be fitted into 2 m, corresponding to a wavelength $\lambda_1$=0.0183 m.

Figure 5:
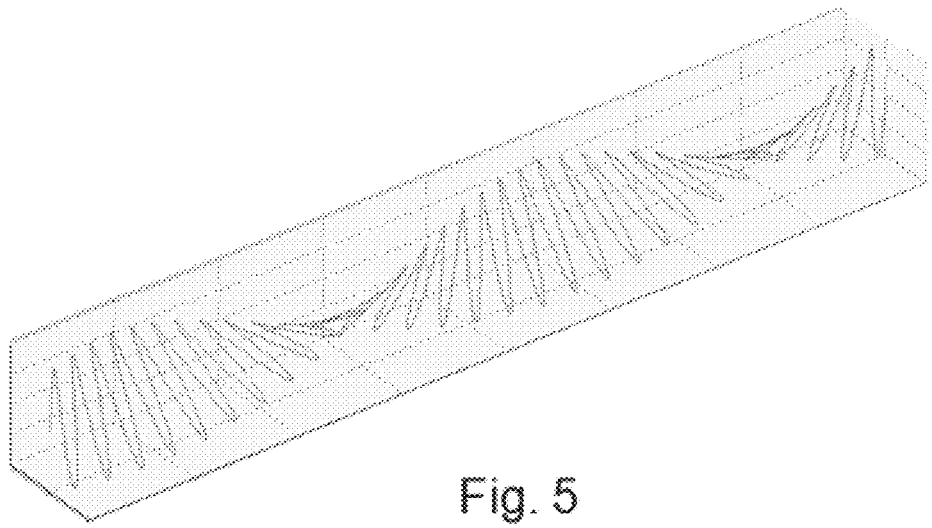
FIG. 5 is a schematic illustration of a twisted strip in accordance with an embodiment of the invention.

A flat strip is only sensitive in the x- and y-directions, but by twisting the strip it can be made sensitive to all 3 directions. FIG. 5 (not to scale) illustrates a twisted strip.

Assuming that the strip is twisted by $\pi$ radians over a distance $\lambda_2$=10 m, within each 10 m there will be 10 m/2 m=5 measurements, each with a different rotation along the cable axis, and each stepping on average by 180/5=36 degrees.

It may further be assumed that over the distance $\lambda_2$ the incident seismic wave is approximately a plane wave. For the highest frequencies in the groundroll this assumption may not be optimal, but otherwise it is reasonable.

As set out in detail above, by measuring the amplitudes over these 5 channels per 10 m and determining (e.g. by interpolation) the maximum and minimum amplitudes, it is possible to determine all 3 components of a wavefield using a single fiber. Reliability of the amplitudes measurements is essential in this process.

There is a risk that the fiber may bend instead of being compressed in the desired geometry, i.e. with an amplitude in the strip of 1.74 cm and a sinusoid length of 1.83 cm. Since at least 5 sample points per 10 m are required, (the maximum station spacing assuming plane waves), a maximum of 2 m are available for the channel spacing along the cable. If it were possible to shift the channels between time samples by a fraction of a m, it would be possible to use large channel spacings along the cable, resulting in longer sinusoid lengths and reduced risk of bending of the fiber.

In preferred embodiments, the cable described herein is used on the earth's surface for detecting/monitoring seismic signals travelling through the subsurface. Thus, it may be used in conjunction with a ground anchor such as is known in the art. Similarly, the cable may be used in one or more boreholes to for detecting/monitoring detect seismic signals travelling through the subsurface.

In addition to the various applications mentioned above, the cables described herein can be used as towed streamer cables or deployed on the seabed (OBC).

The embodiments described herein can be used advantageously alone or in combination with each other and/or with other fiber optic concepts. The methods and apparatus described herein can be used to measure arrival times and waveforms of acoustic signals and in particular broadside acoustic waves. Arrival times and waveforms give information about the formation and can be used in various seismic techniques.

In still other applications, the methods and apparatus described herein can be used to detect microseisms and the data collected using the present invention, including broadside wave signals, can be used in microseismic localization. In these embodiments, the data are used to generate coordinates of a microseism. In still other applications, ability of the present systems to detect broadside waves and axial waves distinguishably can be used in various DAS applications, including but not limited to intruder detection, monitoring of traffic, pipelines, or other environments, and monitoring of various conditions in a borehole, including fluid inflow.

While preferred embodiments have been disclosed and described, it will be understood that various modifications can be made thereto without departing from the scope of the invention as set out in the claims that follow.

The invention claimed is:

1. A fiber optic cable for a fiber optic distributed acoustic sensing assembly, comprising:
   an elongate body; and
   a first optical fiber longitudinally housed in said body, wherein the fiber defines a sinusoid having an amplitude and a first wavelength, wherein the sinusoid passes through a length axis of said body, and wherein the sinusoid rotates about the length axis of the body and wherein the sinusoid rotates along the length of the body so as to define a twisted sinusoid having a twist wavelength.

2. The fiber optic cable of claim 1 wherein the cable provides a plurality of sensing channels and wherein the first wavelength is a function of a desired channel length.

3. The fiber optic cable of claim 2 wherein the first wavelength is further a function of the amplitude.

4. The fiber optic cable of claim 2 wherein the first wavelength is between 0.001 and 0.1 m.

5. The fiber optic cable of claim 2 wherein the first wavelength is between 0.005 and 0.1 m.

6. The fiber optic cable of claim 2 wherein the first wavelength is between 0.005 and 0.05 m.

7. The fiber optic cable of claim 1 wherein the cable defines a helix.

8. The fiber optic cable of claim 1 wherein the amplitude is a function of the thickness of the body.

9. The fiber optic cable of claim 1 wherein the twist wavelength is between 1 m and 50 m.

10. The fiber optic cable of claim 1 wherein the twist wavelength is between 2 m and 20 m.

11. A method for optically sensing an acoustic wave using a fiber optic distributed acoustic sensing assembly, comprising the steps of providing the fiber optic cable of claim 1, and measuring backscattered light from a laser pulse input into the first optical fiber in the fiber optic cable.

* * * * *